United States Patent [19]
Swank
[11] 3,808,477
[45] Apr. 30, 1974

[54] COLD CATHODE STRUCTURE

[75] Inventor: Robert K. Swank, Schenectady, N.Y.
[73] Assignee: General Electric Co., Schenectady, N.Y.

[22] Filed: Jan. 8, 1973
[21] Appl. No.: 321,589

Related U.S. Application Data

[63] Continuation of Ser. No. 209,398, Dec. 17, 1971, abandoned.

[52] U.S. Cl. ... 317/235 N, 317/234 R, 317/235 UA
[51] Int. Cl. ... H01l 15/00
[58] Field of Search ... 317/235 N, 235 UA

[56] References Cited

UNITED STATES PATENTS

| | | | |
|---|---|---|---|
| 3,121,809 | 2/1964 | Atalla | 307/88.5 |
| 3,105,166 | 9/1963 | Choyke | 313/10 |
| 3,699,404 | 10/1972 | Simon | 317/235 R |

*Primary Examiner*—Martin H. Edlow
*Attorney, Agent, or Firm*—Julius J. Zaskalicky; Joseph T. Cohen; Jerome C. Squillaro

[57] ABSTRACT

A semiconductor cold cathode for emitting electrons into a vacuum is described as comprising a semiconductor substrate of a first conductivity type in contact with an electrode for forming a potential energy barrier therewith and having a heterogeneous network of conductors and open spaces for enhancing the emission of electrons into the vacuum. In another embodiment of the invention, the surface-adjacent portion of the semiconductor substrate in the regions underlying the network of conductors is doped with an opposite type conductivity impurity to increase the potential energy barrier in the substrate adjacent to the conductors so as to further enhance electron emission from the open spaces in the heterogeneous network. In yet another embodiment of the invention, the surface-adjacent region of the substrate is provided with a layer of opposite-type conductivity material so as to further increase the potential barrier at the grids and also to increase the energy level of the emitted electrons.

2 Claims, 8 Drawing Figures

Inventor:
Robert K. Swank,
by Jerome C. Squillaro
His Attorney.

Inventor:
Robert K. Swank,
by Jerome C. Squillaro
His Attorney.

COLD CATHODE STRUCTURE

This is a continuation of application Ser. No. 209,398, filed Dec. 17, 1971, now abandoned.

The present invention relates to improvements in cathode structures and more particularly to cathode structures which emit electrons into a vacuum without the generation of a significant amount of heat.

Most present day vacuum tubes employ thermionic or hot cathodes as a source of electrons. These cathodes however consume a considerable amount of power in heating the cathode and hence produce a considerable amount of heat and/or light which often interfere with the operation of the tube. Additionally, due to the massive heat lag, the flow of electrons cannot be conveniently controlled at the cathode and hence a separate control grid electrode is required to control the electron flow to an anode. The control grid, however, lacks high sensitivity and does not permit the full use of the current output from the cathode. Still another disadvantage of hot cathodes is its limited lifetime.

To overcome the difficulties of the thermionic cathode devices, a number of cold-cathode devices have been proposed. Cold cathode devices emit electrons without a significant increase in temperature. Three such devices are the field-emission cathode, the tunnel cathode and the semiconductor cathode. The field-emission cathode is used primarily in special purpose applications, but its use is limited by its instability and the requirement of very high voltages. The tunnel diode uses the tunneling of electrons through a thin dielectric to achieve the energy necessary for ejection of electrons into the vacuum. Although much research has been done on this device, its efficiency is still very much lower than that of the hot cathode.

The semiconductor cathode makes use of the built-in voltage of a P-N junction or a Schottky barrier to raise the energy of the electrons sufficiently to overcome the vacuum barrier. Since this built-in voltage is usually only a few electron volts, surface treatment is required to lower the vacuum barrier. One such device is described in *Applied Physics Letters* by Williams and Wronski, Vol. 13, No. 7, Oct. 1, 1968. A similar device is described by Geppert in U.S. Pat. No. 3,150,282. These devices, however, exhibit very low emission efficiencies, i.e., the ratio of emitted electron current to the current flowing between the electrodes of the semiconductor.

In both of the aforementioned devices, a major source of inefficiency is the loss of electrons (due to recombination) in the p-type side of the P-N junction or in the metal electrode in the case of the Schottky barrier device. While the Schottky barrier metal electrode can be made very thin (less than 100 Angstroms thick) to minimize this effect, such films tend to be discontinuous, are not homogeneous and do not provide an efficient structure for the emission of electrons.

It is therefore an object of the instant invention to provide an improved electrode configuration for a semiconductor cold cathode structure so that high efficiencies of emission are obtained.

Another object of the invention is to provide a novel structure for a semiconductor cold cathode which is easily fabricated in accord with accepted semiconductor fabrication processes.

Another object of the invention is to provide a semiconductor cathode structure which emitts electrons into a vacuum with greater efficiencies than prior art devices.

These and other objects of the invention are achieved in accord with the disclosed embodiments by a cathode structure comprising an n-type semiconductor wafer with a novel electrode applied to one major surface thereof and forming a potential energy barrier such as a Schottky barrier with the semiconductor wafer. In accord with one embodiment of the invention, the emission of electrons from the surface of the semiconductor into a vacuum is enhanced by forming the electrode of a heterogeneous network of conductors with open spaces therebetween so that electrons more readily escape into the vacuum from the open spaces between the conductors. In accord with another embodiment of the invention, even higher efficiencies of emission are achieved by doping the semiconductor wafer in the regions underlying the conductors so as to provide a surface-adjacent opposite-conductivity-type region under the conductors and hence an increased energy barrier which reduces electron flow to the conductors. In yet another embodiment of the invention, still higher efficiencies of electron emission are achieved by employing the aforementioned heterogeneous network over a semiconductor substrate having a surface-adjacent portion of opposite conductivity in the open spaces between the conductors, with increased doping in regions underlying the conductors.

The novel features believed characteristic of this invention are set forth with particularity in the appended claims. The invention itself, both as to its organization and method of operation, as well as additional objects and advantages thereof, will be best understood from the following description taken in connection with the accompanying drawing, in which:

Figure 1:
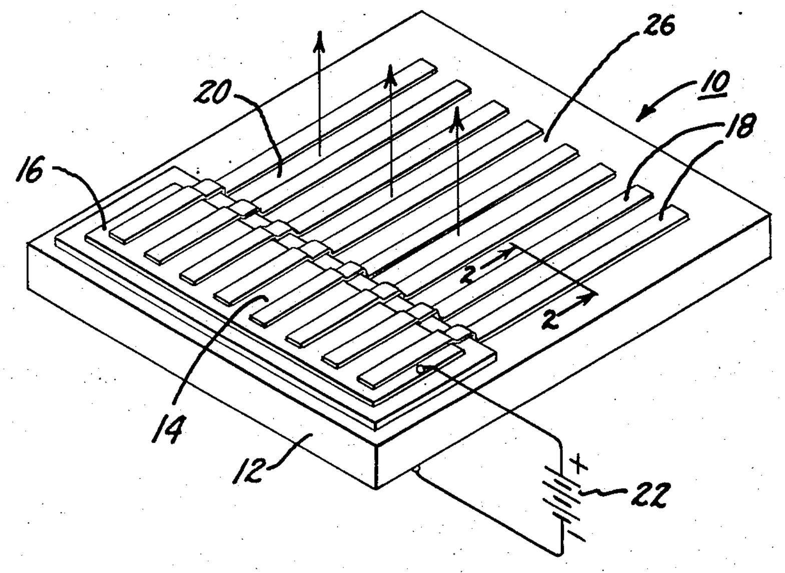
FIG. 1 is a perspective view of an embodiment of the invention.

By way of example and in accord with one embodiment of the invention, FIG. 1 illustrates a semiconductor cold cathode 10 comprising a large band gap semiconductor substrate or wafer 12 of n-type conductivity, such as, zinc sulfide, gallium arsenide, gallium phosphide, silicon carbide, or other semiconductors having band gaps greater than approximately 1.2 electron-volts. The substrate 12 is provided with a low resistivity metal contact pad 14, such as gold or silver, insulated from the surface of the substrate 12 by a layer of dielectric material 16, such as vapor deposited silicon nitride, silicon dioxide, magnesium fluoride or any of the other well-known dielectrics used in semiconductor fabrication. Over the surface of the semiconductor substrate 12 is a heterogeneous network of conductors 18 with open spaces 20 therebetween. The conductors 18 may, for example, comprise fine strips of high work function metal, such as palladium, silver, gold or platinum formed in such a manner (e.g., vapor deposition) as to make electrical contact with the metal pad 14 and the surface of the semiconductor substrate 12.

Figure 2:
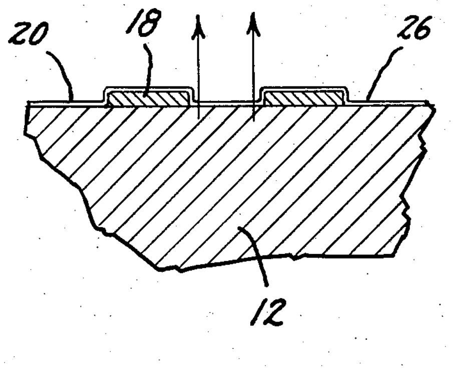
FIG. 2 is a partial cross-sectional view taken along the lines 1—1 of FIG. 1.

FIG. 2 is a partial cross-section of the cold cathode illustrated in FIG. 1 and more clearly depicts the heterogeneous network of conductors 18 and open spaces 20 with electrons being emitted from the open spaces 20 between the conductors. FIG. 2 also illustrates the presence of a low work function surface layer 26, such as cesium, which is preferably deposited over the surface of the conductors and the spaces therebetween.

The emission of electrons from the cold cathode 10 is achieved by providing a difference of potential between the semiconductor substrate 12 and the conductors 18. As illustrates in FIG. 1, this is readily achieved by providing a voltage source 22 such as a battery with its positive terminal connected to the metal contact pad 14 and its negative terminal connected to the semiconductor substrate 12. In actual operation of such a device, the cold cathode 10 is preferably enclosed in an evacuated enclosure, such as, for example, a conventional vacuum tube, with a collector electrode spaced at a distance from the cathode for collecting the electrons emitted therefrom. As illustrated in FIG. 2, upon application of a forward bias voltage, electrons are emitted from the surface of the semiconductor 12 in the open spaces 20 with high efficiency.

Figure 3:
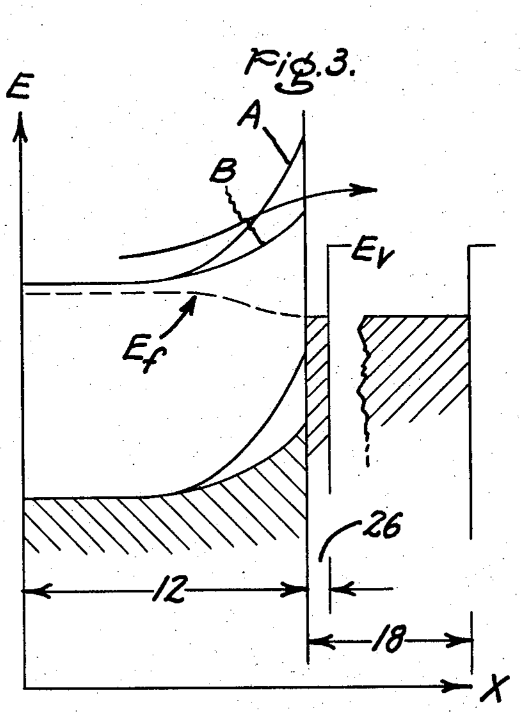
FIG. 3 is an energy diagram of a forwardly biased cathode structure illustrated in FIGS. 1 and 2.

The manner in which electrons are emitted from the cold cathode structures illustrated in FIGS. 1 and 2 can be more readily appreciated by reference to FIG. 3 which illustrates a potential energy diagram for the aforementioned embodiments of the invention. More specifically, FIG. 3, a cross-sectional diagram of energy level vertically and displacement across the cathode horizontally, illustrates the potential barrier existing at the interface of the semiconductor 12 and the heterogeneous network with an operating bias voltage applied therebetween. The dashed line $E_f$, illustrates the Fermi level of the semiconductor. Curve A illustrates the potential barrier in the semiconductor 12 adjacent one of the conductors 18, while Curve B is the corresponding potential barrier in the semiconductor adjacent to one of the open spaces 20, where the low work function coating 26 contacts the semiconductor 11. Because of the difference in work functions between the low work function coating 26 and the conductors 18, the barrier illustrated by Curve A is higher than that of Curve B. As a result, very little current flows to the conductors 18, while nearly all of the current flows in the open spaces 20 between the conductors. At this point, a large fraction of the electrons leave the surface of the semiconductor and pass into the vacuum because the low work function coating 26 lowers the surface barrier so that the top of the barrier illustrated by Curve B is higher than the vacuum energy level, $E_v$, which is equal to the energy of an electron at rest in the vacuum outside the semiconductor surface. In other words, the semiconductor has acquired a negative electron affinity as a result of the application of the low work function coating.

Some electrons which reach the semiconductor surface are not emitted into the vacuum and must be conducted back to the conductors 18 so as to prevent a charge build-up at the surface of the semiconductor. This conductivity may be provided by the surface states of the semiconductor 12 or by the low work function coating 26. In instances where high current densitites of electrons are required, it may be desirable to employ a thin metal film between the surface of the semiconductor 12 and the low work function coating 26 to further reduce the possibility of a charge build-up.

A typical cold cathode constructed in accord with the teachings of the instant invention may comprise a semiconductor substrate 12 of n-type zinc sulfide, the dielectric 16 may be evaporated magnesium fluoride, the metal pad 14 may be evaporated silver, conductors 18 may be evaporated palladium, while the low work function coating 26 may be alternate layers of cesium and oxygen, preferably with an excess of cesium.

Figure 4:
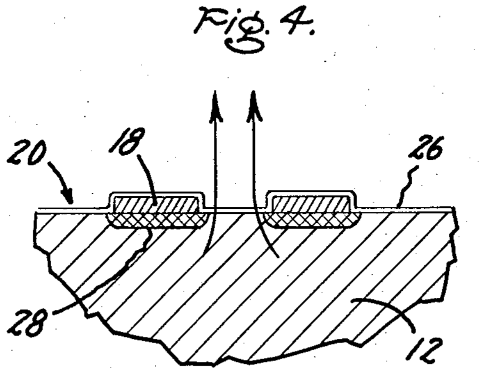
FIG. 4 is a partial cross-sectional view of another embodiment of the invention.

FIG. 4 illustrates an enlarged cross-sectional view of another embodiment of the invention which may take the same physical configuration as that illustrated in FIG. 1, with the primary difference residing in the existence of opposite conductivity regions 28 produced in the semiconductor substrate 12 in the regions underlying the conductors 18. These opposite conductivity type regions can very readily be produced by appropriately selecting the conductors 18 of a material which diffuses into the semiconductor 12 (at diffusion temperatures) and acts as an acceptor dopant in the semiconductor substrate 12.

Figure 5:
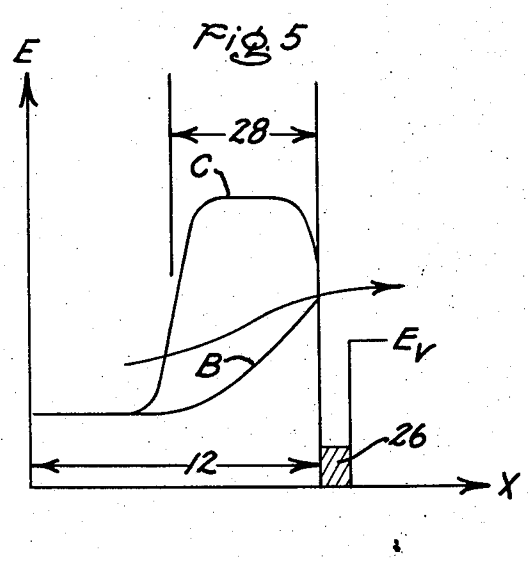
FIG. 5 is an energy diagram of the forwardly biased cathode structure of FIG. 4.

The effect of the opposite conductivity type regions 28 is to reduce still further, the amount of current conducted by the conductors 18 and thereby increase the efficiency of electron emission. This situation is illustrated more clearly by the energy diagram of FIG. 5 wherein the Curve C illustrates the large barrier produced in the semiconductor substrate 12 in front of each conductor and Curve B illustrates the smaller barrier in the open spaces over which the emitted electron current flows, the same as in FIG. 3.

Figure 6:
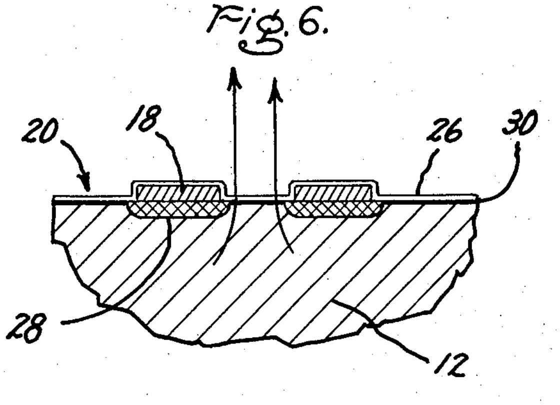
FIG. 6 is a partial cross-sectional view of yet another embodiment of the invention.

Still greater efficiencies of emission can be obtained in accord with yet another embodiment of the invention illustrated in FIG. 6. In this embodiment of the invention, in addition to the opposite-type-conductivity region 28 described above, an additional region 30 also of opposite conductivity, is provided in the surface-adjacent region of the semiconductor substrate 12. This additional region 30 is preferably between 10 and 300 Angstroms in thickness and covers the surface-adjacent open spaces 20 of the semiconductor substrate 12. This region may typically be produced by the well-known process of ion implantation of impurity atoms into the semiconductor substrate 12.

Figure 7:
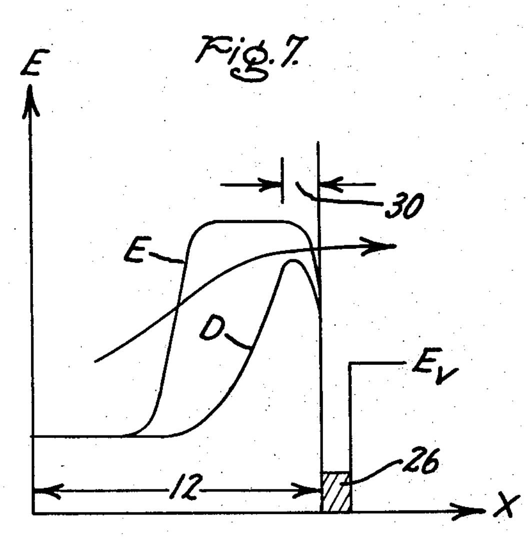
FIG. 7 is an energy diagram of the forwardly biased cathode structure illustrated in FIG. 6.

The operation of the embodiment illustrated in FIG. 6 is best understood by reference to the energy diagram of FIG. 7. In particular, Curve D illustrates the effects of the region of opposite conductivity 30 on the height of the surface barrier. As illustrated, electrons passing into the vacuum have a higher energy than those passing into the vacuum from the embodiment illustrated in FIG. 4. The height of the barrier illustrated by Curve D is still lower than the barrier illustrated by Curve E but is much higher than that illustrated by Curve B of FIG. 5. The effect of the increased barrier height is to produce a larger negative electron affinity at the semiconductor surface and thereby increase the fraction of the electrons emitted into the vacuum.

Figure 8:
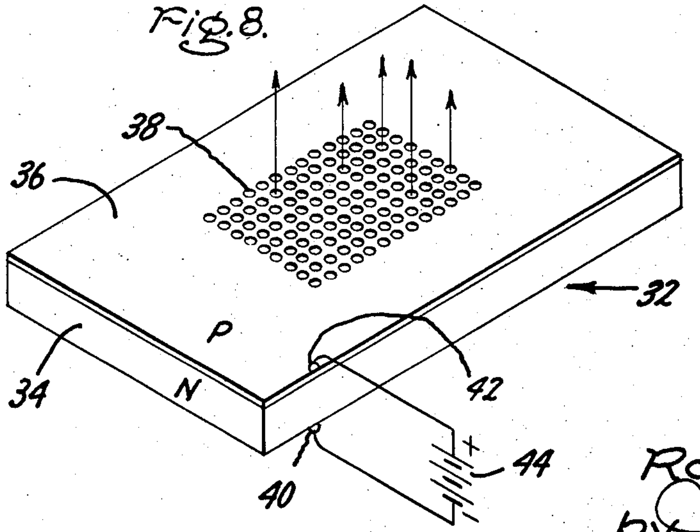
FIG. 8 illustrates yet another embodiment of the invention.

FIG. 8 illustrates yet another embodiment of the invention having characteristics substantially similar to those described with reference to FIGS. 4 through 7, but is produced by different fabrication techniques. For example, as illustrated in FIG. 8, a cold cathode structure 32 is produced by beginning with an n-type semiconductor wafer 34 onto which a p-type region 36 is formed, either by epitaxy or diffusion, for example. The p-type region 36 is preferably in the range of 0.1 to 100 microns in thickness. By photolithographic masking and etching techniques, at least one and preferably a plurality of small apertures or openings 38 are produced in the p-type region. By selecting suitable etchants, such as those which only p-type semiconductor material, the etching can be made to stop at the space-charge region of the P-N junction. Alternately, the etchant and etching time may be selected to etch through to the n-type region. In the former case, the resultant device exhibits characteristics similar to those described above with reference to FIGS. 6 and 7. In the latter case, the resultant device exhibits characteristics similar to those described above with reference to FIGS. 4 and 5; however, by counter-doping the exposed n-type semiconductor substrate with p-type impurities, characteristics of the device described with reference to FIGS. 6 and 7 are obtained. In the embodiment illustrated in FIG. 8, the P-region 36 surrounding the openings 38 provides substantially the same function as the conductors 18.

After selecting the desired configuration, ohmic contacts 40 and 42 are made to the n- and p-type regions, respectively, and the substrate is placed in a vacuum, where after suitable cleaning the surface of the p-region and the aperture-exposed semiconductor regions are covered with a low work function material such as cesium. When forward biased by a voltage source 44, electrons are emitted into the vacuum. The operation of this embodiment of the invention is dependent upon the selected configuration as described above.

From the foregoing description of several embodiments of the invention, it will be readily appreciated that cold cathodes constructed in accord with the teachings of the instant invention exhibit high electron emission efficiencies since few electrons are trapped in the heterogeneous network of conductors. Cathodes fabricated in accord with the teachings of the instant invention have many uses in the field of electronics; for example, cathode ray tubes, display devices, microwave generators, amplifiers and information processing devices, to mention only a few.

While only certain preferred embodiments have been shown by way of illustration, many modifications and changes will occur to those skilled in the art. For example, the heterogeneous network of conductors and open spaces may take various other configurations than those illustrated such as, for example, gridded, crossed, filigreed, and netted. Further, although the semiconductor material has been described as having a band gap in excess of approximately 1.2 electron-volts, those skilled in the art can readily appreciate that with technological improvements, this value may be lowered. Accordingly, the invention is not limited to semiconductors having band gaps greater than approximately 1.2 electron-volts, but rather includes any semiconductor having a band gap greater than the work function at the surface of the semiconductor-vacuum interface. Therefore, it is to be understood that the appended claims are intended to cover all such modifications and changes which fall within the true spirit and scope of the invention.

What I claim as new and desire to secure by Letters Patent of the United States is:

1. An electron emitting cathode structure comprising a semiconductor substrate of N-type conductivity, a network of conductors with open spaces therebetween overlying one surface of said semiconductor substrate, first means including first surface adjacent regions of P-type conductivity in said substrate underlying said network of conductors to form a first potential barrier between said substrate and said network of conductors, second means including second surface adjacent regions of P-type conductivity in said substrate not covered by said network of conductors extending into said substrate to a depth less than the depth of said first regions of P-type conductivity to form a second potential barrier between said substrate and said one surface smaller than said first potential barrier and a surface barrier lowering material overlying said network of conductors and open spaces for enhancing the emission of electrons into a vacuum, whereby the emission of electrons from the open spaces between said network of conductors is enhanced and current flow thereto is minimized.

2. The electron emitting cathode structure of claim 1 wherein said semiconductor substrate comprises a material selected from the group consisting of zinc sulfide, gallium arsenide, gallium phosphide and silicon carbide.

* * * * *